United States Patent
Jones et al.

(10) Patent No.: US 9,869,200 B2
(45) Date of Patent: Jan. 16, 2018

(54) TURBINE VANE HOLLOW INNER RAIL

(75) Inventors: Richard Jones, Lincolnshire (GB); Andy Pacey, Lincoln (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 1052 days.

(21) Appl. No.: 13/642,881

(22) PCT Filed: Mar. 30, 2011

(86) PCT No.: PCT/EP2011/054931
§ 371 (c)(1),
(2), (4) Date: Mar. 27, 2013

(87) PCT Pub. No.: WO2011/134731
PCT Pub. Date: Nov. 3, 2011

(65) Prior Publication Data
US 2013/0202409 A1    Aug. 8, 2013

(30) Foreign Application Priority Data

Apr. 29, 2010  (EP) .................................... 10161435

(51) Int. Cl.
*F01D 1/02*    (2006.01)
*F01D 25/12*    (2006.01)
(Continued)

(52) U.S. Cl.
CPC .............. *F01D 25/12* (2013.01); *B23P 15/04* (2013.01); *F01D 5/189* (2013.01); *F01D 9/02* (2013.01);
(Continued)

(58) Field of Classification Search
CPC .......... F01D 5/189; F01D 5/181; F01D 9/041; F01D 11/001; F01D 11/005; F01D 25/12;
(Continued)

(56) References Cited

U.S. PATENT DOCUMENTS 3,700,348 A * 10/1972 Corsmeier .............. F01D 5/189
                                                          416/231 R
3,829,233 A    8/1974 Hultgren
(Continued)

FOREIGN PATENT DOCUMENTS

CN    1488839 A    4/2004
EP    1045114 A2    10/2000
(Continued)

*Primary Examiner* — Mark Laurenzi
*Assistant Examiner* — Anthony Ayala Delgado

(57) ABSTRACT

A guide vane device for a turbine has an inner platform with a through hole forming a fluid channel for a cooling fluid, wherein the inner platform extends in a circumferential direction around a shaft of the turbine. The guide vane device further includes a hollow aerofoil with a cooling opening for exchanging the cooling fluid passing the through hole into or from the hollow aerofoil, wherein the hollow aerofoil is fixed to a first surface of the inner platform, and a rail with a recess with a cooling fluid passage forming a passage for the cooling fluid to the through hole, wherein the rail is fixed to a second surface of the inner platform and the rail extends along the second surface in the circumferential direction around the shaft. The cooling fluid passage has in the circumferential direction at least the dimension of the through hole.

5 Claims, 4 Drawing Sheets

(51) Int. Cl.
  *F01D 5/18*   (2006.01)
  *F01D 9/02*   (2006.01)
  *F01D 9/04*   (2006.01)
  *F01D 9/06*   (2006.01)
  *F01D 11/00*  (2006.01)
  *B23P 15/04*  (2006.01)

(52) U.S. Cl.
  CPC ............ *F01D 9/042* (2013.01); *F01D 9/047* (2013.01); *F01D 9/06* (2013.01); *F01D 11/001* (2013.01); *F01D 11/005* (2013.01); *F05D 2240/12* (2013.01); *F05D 2240/81* (2013.01); *F05D 2240/91* (2013.01); *F05D 2260/201* (2013.01); *Y10T 29/49316* (2015.01)

(58) Field of Classification Search
  CPC ... F01D 9/02; F01D 9/047; F01D 9/06; F01D 5/18; F01D 5/187; F01D 9/04; F05D 2240/12; F05D 2240/81
  USPC ........................................................ 415/115
  See application file for complete search history.

(56) References Cited

U.S. PATENT DOCUMENTS

| | | |
|---|---|---|
| 4,126,405 A | 11/1978 | Heyser |
| 4,930,980 A | 6/1990 | Donlan |
| 5,114,159 A | 5/1992 | Griffin, Jr. |
| 6,077,034 A | 6/2000 | Tomita et al. |
| 6,397,604 B2 * | 6/2002 | Eldrid ............... F01D 5/088 415/115 |
| 6,439,837 B1 | 8/2002 | Heyward et al. |
| 6,506,020 B2 * | 1/2003 | Dailey ............... F01D 5/18 416/96 R |
| 2006/0013685 A1 * | 1/2006 | Ellis ............... F01D 9/041 415/210.1 |

FOREIGN PATENT DOCUMENTS

| | | |
|---|---|---|
| EP | 1793088 A2 | 6/2007 |
| GB | 938247 A | 10/1963 |

\* cited by examiner

TURBINE VANE HOLLOW INNER RAIL

CROSS REFERENCE TO RELATED APPLICATIONS

This application is the US National Stage of International Application No. PCT/EP2011/054931 filed Mar. 30, 2011, and claims the benefit thereof. The International Application claims the benefits of European Application No. 10161435.2 EP filed Apr. 29, 2010. All of the applications are incorporated by reference herein in their entirety.

FIELD OF INVENTION

The present invention relates to a guide vane device for a turbine and to a method of producing a guide vane device for a turbine.

ART BACKGROUND

Conventional turbine nozzle guide vanes have to withstand high levels of stress in the aerofoil and in particular in the trailing edge fillets. This stress is mostly caused by different heating and cooling rates within the components during transient operations conditions of the turbine. Aerofoils of the guide vanes are formed on an inner platform that extends in a circumferential direction of the turbine shaft. From the inner platform, the aerofoils extend radially outwardly. From the inner platform in radial direction to the center of the turbine shaft an inner rail is attached. The inner rail is used to mount a diaphragm between the surface of the turbine shaft and the inner platform. The inner rail is in general thicker and broader than the inner platform to which the inner rail is attached, so that the inner rail reacts slower in response to temperature changes in the turbine with respect to the inner platform. This may result in thermally induced stress and reduces the lifetime of the conventional nozzle guide vane devices.

In conventional turbine nozzle guide vanes, the stresses may be reduced by keeping the depth and width of the inner rail to a minimum required. This may also lead to a reduction of the lifetime of the inner rail respectively to the turbine nozzle guide vane and reduces the quality of fixation of the diaphragms.

U.S. Pat. No. 4,126,405 describes a segment of a turbo machine nozzle that is held tangentially in position by a pair of lugs extending radially from outer and inner bands. Each lug acts as an end cap to prevent leakage of air from one end of the vane.

EP 1 793 088 A2 discloses a turbine nozzle for a gas turbine engine. The turbine nozzle comprises an outer band and an inner band. Between the inner band and the outer band vanes are formed. To the inner band a flange and a forward inner flange is formed, wherein the flanges extend radially inwardly from the inner band.

U.S. Pat. No. 3,829,233 discloses a seal arrangement for a bladed diaphragm of an axial flow fluid machine, such as a gas turbine. The turbine comprises an inner shroud from which the vanes extend radially outwardly with respect to the turbine shaft and from which flanges and ribs extend radially inwardly. To the flanges and ribs a seal housing ring or a diaphragm is attached, so that the inner shroud is sealed from the turbine shaft. The inner shroud comprises an orifice for cooling fluid, wherein the orifice is spatially located from the flanges and ribs.

SUMMARY OF THE INVENTION

There may be a need for designing a guide vane device with a proper lifetime and adequate maintenance properties.

This need may be met by a guide vane device for a turbine and a method of producing a guide vane device according to the independent claims.

According to a first aspect of the invention, a guide vane device for a turbine is provided. The guide vane device comprises an inner platform, a hollow aerofoil and a rail. The inner platform comprises a through hole forming a fluid channel for a cooling fluid. The inner platform extends in circumferential direction around a shaft of the turbine. The hollow aerofoil comprises a cooling opening for exchanging the cooling fluid passing the through hole into or from the hollow aerofoil. The hollow aerofoil is fixed to a first surface of the inner platform. The rail comprises a recess with a cooling fluid passage, wherein the cooling fluid passage forms a passage for the cooling fluid to the through hole. The rail is fixed to a second surface of the inner platform and the rail extends along the second surface in the circumferential direction around the shaft. The cooling fluid passage comprises in the circumferential direction at least the dimension of the through hole.

According to a further aspect of the invention, a method for producing a guide vane device for a turbine is provided. According to the method, an inner platform with the through hole for forming a fluid channel for a cooling fluid is provided. The inner platform extends thereby in a circumferential direction around the shaft of the turbine. Next, a hollow aerofoil is fixed to a first surface (e.g. which is aligned radially outwardly to the turbine axis) of the inner platform, wherein the hollow aerofoil comprises a cooling opening for exchanging the cooling fluid passing the through hole into or from the hollow aerofoil. A rail is fixed to a second surface (e.g. which is aligned radially inwardly to the turbine axis) of the inner platform and the rail extends along the second surface in the circumferential direction around the shaft. The rail comprises a recess with the cooling fluid passage for forming a passage for the cooling fluid. The cooling fluid passage comprises in the circumferential direction at least a dimension of the through hole.

The inner platform extends around the circumferential direction along the turbine shaft. The inner platform may comprise an internal cooling channel extending as well in circumferential direction through which cooling fluid may be transported. At desired locations, in particular at a location, where the cooling fluid is fed into an aerofoil, the through hole is formed. With the through hole, the cooling fluid is exchanged into or from the hollow aerofoil. Moreover, the through hole forms a cooling fluid connection to the rail, so that also cooling fluid is exchangeable in a direction to or from the direction to the turbine shaft.

The rail extends along the second surface of the inner platform in the circumferential direction around the turbine shaft. Moreover, the rail extends radially inwardly to the turbine shaft starting from the second surface. The rail provides a defined rigidity in order to fix a sealing element, such as a diaphragm, between the second surface of the rail and a surface of the turbine shaft.

Moreover, the rail comprises a recess with a cooling fluid passage. The cooling fluid passage forms a channel (that extends radial to the turbine shaft) between the through hole of the inner platform and the space between the inner platform and the turbine shaft. When cooling fluid passes the cooling fluid passage, the rail is cooled by the cooling fluid. Hence, the cooling fluid cools both, the rail and the inner platform.

The cooling fluid passage may be free of further conduit elements or tubes. In other words, the cooling fluid streaming through the cooling fluid passage is in direct contact with the surface of the rail which forms the cooling fluid passage. Furthermore, the through hole of the inner platform may be free of further conduit elements or tubes. The cooling fluid streaming through the through hole may be in direct contact with the surface of the inner platform which forms the through hole. Hence, the opening sizes of the cooling fluid passage and the through hole directly may determine a respective flow cross-section for the cooling fluid.

The smallest opening or diameter restricts the fluid velocity and thus the cooling efficiency. In particular, if the cooling fluid passage of the rail is equal or larger than the through hole of the inner platform, the cooling fluid cools with the same cooling efficiency the rail and the inner platform.

The dimension of the through hole denotes in particular the size of the cooling fluid passage and the through hole along the circumferential direction. If the through hole and/or the cooling fluid passage are circular, the dimension denotes for instance the diameter. If the shape of the through hole or the cooling fluid passage is elliptical, the dimension may define the major axis or the transverse diameter, for example. If the shape of the cooling fluid passage and/or the through hole is rectangular, the dimension may denote the length along the circumferential direction. Additionally or alternatively, the term "dimension" denotes the cross-sectional area of the overlapping cross-sections of the cooling fluid passage with the through hole. In other words, the cross-sectional area of the cooling fluid passage is larger than the cross-sectional area of the through hole in the section, where the cooling fluid passage overlaps the cross-section of the through hole.

The aerofoil comprises a wing profile comprising a trailing edge and a leading edge. The working medium flows against the leading edge and is guided by the surface (profile) of the aerofoil to the trailing edge, where the working medium leaves the aerofoil with a predetermined and desired flow direction. The leading edge and the trailing edge are connected by an imaginary straight line called the cord. The cord of the aerofoil comprises an angle between 0° and 90° degrees to the (circumferential) extending direction. The rail is formed in general along the circumferential direction. Thus, the overlapping cross-section areas of the cooling opening of the aerofoil, the through hole as well as the cooling fluid passage overlap and form an overlapping cross-section. The cooling fluid flows through the overlapping cross-section. The cooling fluid passage is formed larger than the through hole in the overlapping cross-section, so that the maximum mass flow of the cooling fluid is not restricted by the dimension of the cooling fluid passage of the rail. In other words, the cooling fluid passage does not form the smallest passage of the cooling fluid in comparison to the through hole of the inner platform and the aerofoil.

For this reason, because the cooling fluid cools the inner rail and the inner platform with the same cooling efficiency, the temperature difference of the inner platform and the rail is reduced. In particular, a larger cooling fluid passage of the rail with respect to the through hole may allow the rail to follow the temperature change rate of the bulk temperature of the rest of the guide vane device elements, such as the inner platform and the hollow aerofoil. This results in less thermal stress during transient and fast changing temperature conditions.

Hence, when reducing the thermal stress of the rail by adapting the dimension of the cooling fluid passage, the thermal stress of the rail is reduced and damages, such as cracking due to thermal differences, may be reduced.

According to an exemplary embodiment the recess is larger than the through hole of the inner platform. The recess may be formed like a slotted hole wherein the length of the slotted hole extends in the circumferential direction with respect to the shaft. Thus, the rail comprises less weight because more material can be removed from the rail. According to a further exemplary embodiment, the rail is integrally formed within a platform. In particular, the rail and the inner platform may form a monolithic structure and may be casted in one workstep.

According to a further exemplary embodiment, the guide vane device comprises a further hollow aerofoil. The inner platform comprises a further through hole forming a further fluid channel for the cooling fluid. The further hollow aerofoil comprises a further cooling opening for receiving the cooling fluid passing the further through hole into the further hollow aerofoil, wherein the further hollow aerofoil is fixed to the first surface of the inner platform. The rail comprises a further recess with a further cooling fluid passage forming a further passage for the cooling fluid to the through hole. The further cooling fluid passage comprises in circumferential direction at least the dimension of the further through hole. The guide vane device may form a segment of a circumferential stator stage of a turbine. The segment may comprise only one or a plurality of aerofoils that are attached to the first surface of the inner platform. Each segment may be connected to an adjacent guide vane segment in circumferential direction. Each guide vane device may be attached to a further guide vane device by a detachable connection. However, the segment may comprise e.g. 3, 4, 5 or more aerofoils. The guide vane device (segment) may also form a full (360 degree) section with a plurality of aerofoils. Thus, damaged guide vane devices (guide vane segments) may be exchanged. Hence, the maintenance costs are reduced.

According to a further exemplary embodiment, the guide vane device further comprises a diaphragm for sealing the guide vane device with respect to the shaft. The rail comprises a mounting section to which the diaphragm is mounted. The rail fixes the diaphragm in such a way, that the diaphragm is kept in a desired position in which the diaphragm seals an inner space between the inner platform and the turbine axis. Due to the proper cooling of the rail by the larger dimension of the through hole, the thermal deformation of the rail is reduced, so that gaps between the diaphragm and the rotating turbine shaft caused by the thermal deformation are smaller. The mounting section is formed e.g. for providing a clamping fixation, a screw connection and/or a welded connection. Moreover, the diaphragm forms a sliding connection with the shaft, so that the shaft is rotatable with respect to the diaphragm. The sliding connection provides a sealing between the shaft and the diaphragm as well.

According to a further exemplary embodiment, the guide vane device further comprises an outer platform to which the hollow aerofoil is attached with an outer end of the hollow aerofoil with respect to an inner end of the hollow aerofoil that is attached to the inner platform. The outer platform, the aerofoil and the inner platform may be formed monolithic (integrally), e.g. by casting.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
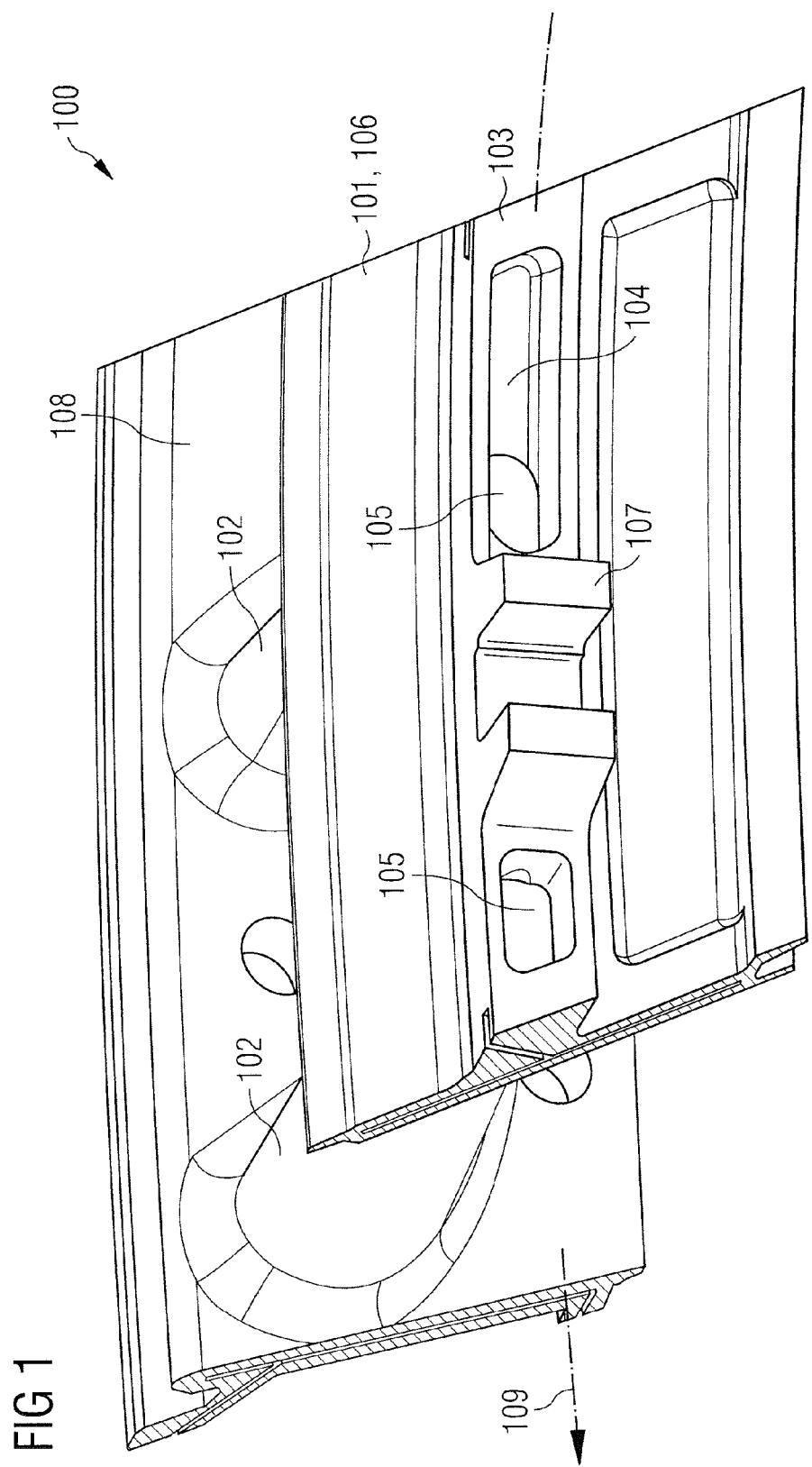
FIG. 1 illustrates a perspective view of the guide vane device according to an exemplary embodiment of the present invention.

The illustrations in the drawings are schematical. It is noted that in different figures, similar or identical elements are provided with the same reference signs.

FIG. 1 illustrates a guide vane device 100 for a turbine. The guide vane device 100 comprises an inner platform 101, a hollow aerofoil 102 and a rail 103. The inner platform 101 comprises a through hole 301 (see FIG. 3, not shown in FIG. 1) forming a fluid channel for a cooling fluid. The inner platform 101 extends in circumferential direction 109 around a shaft 304 (see FIG. 3) of the turbine. The hollow aerofoil 102 comprises a cooling opening for exchanging the cooling fluid passing the through hole 301 into or from the hollow aerofoil 102. The hollow aerofoil 102 is fixed to a first surface 201 (see FIG. 2) of the inner platform 101. The rail 103 comprises a recess 104 with a cooling fluid passage 105 forming a passage for the cooling fluid to the through hole 301. The rail 103 is fixed to a second surface 106 of the inner platform 101 and the rail 103 extends along the second surface 106 in the circumferential direction 109 around the shaft 304. The cooling fluid passage 105 comprises in the circumferential direction 109 at least the dimension of the through hole 301.

As can be taken from FIG. 1, the recess 104 with the cooling fluid passage 105 of the rail 103 comprises equal or larger dimensions as the through hole 301 in particular in the circumferential direction 109. Thus, the rail bulk temperature changes in the same way as the inner platform 101 and the hollow aerofoil 102, so that less thermal stress, in particular during varying condition, is generated.

Moreover, FIG. 1 illustrates the cooling fluid passage 105 that is formed in the recess 104 of the rail 103. The recess 104 is a slotted hole or a through hole that extends in circumferential direction 109. Because material is milled off from the rail 103 when forming the recess 104, the rail 103 comprises less weight. Moreover, because the rail 103 comprises less material, the rail 103 is faster adaptable to varying temperatures and is faster adaptable to the temperature of the inner platform 101 by the cooling fluid. Moreover, the cooling fluid flows through the cooling fluid passage 105 and as well through or into the recess 104. The recess 104 forms a large contact surface with the cooling fluid, so that the cooling fluid cools the rail 103 more efficiently.

The guiding vane device 100 according to the exemplary embodiment of FIG. 1 comprises two aerofoils 102, e.g. turbine vanes within a gas turbine engine. Each aerofoil 102 is formed between the inner platform 101 and an outer platform 108. The outer platform 108 is fixable to the casing of the turbine, for example.

The rail 103 shown in FIG. 1 further comprises a mounting section 107. The mounting section 107 comprises fixing means that are adapted for fixing a sealing element, in particular a diaphragm 303 (see FIG. 3). The circumferential position of the mounting section 107 may be between the two cooling fluid passages 105 for the two aerofoils 102. Particularly the circumferential position of the mounting section 107 may be such that it will allow the largest possible cross section for both of the two cooling fluid passages 105. Advantageously the fluid flow through the two cooling fluid passages 105 may not be additionally restricted by the mounting section 107.

Figure 2:
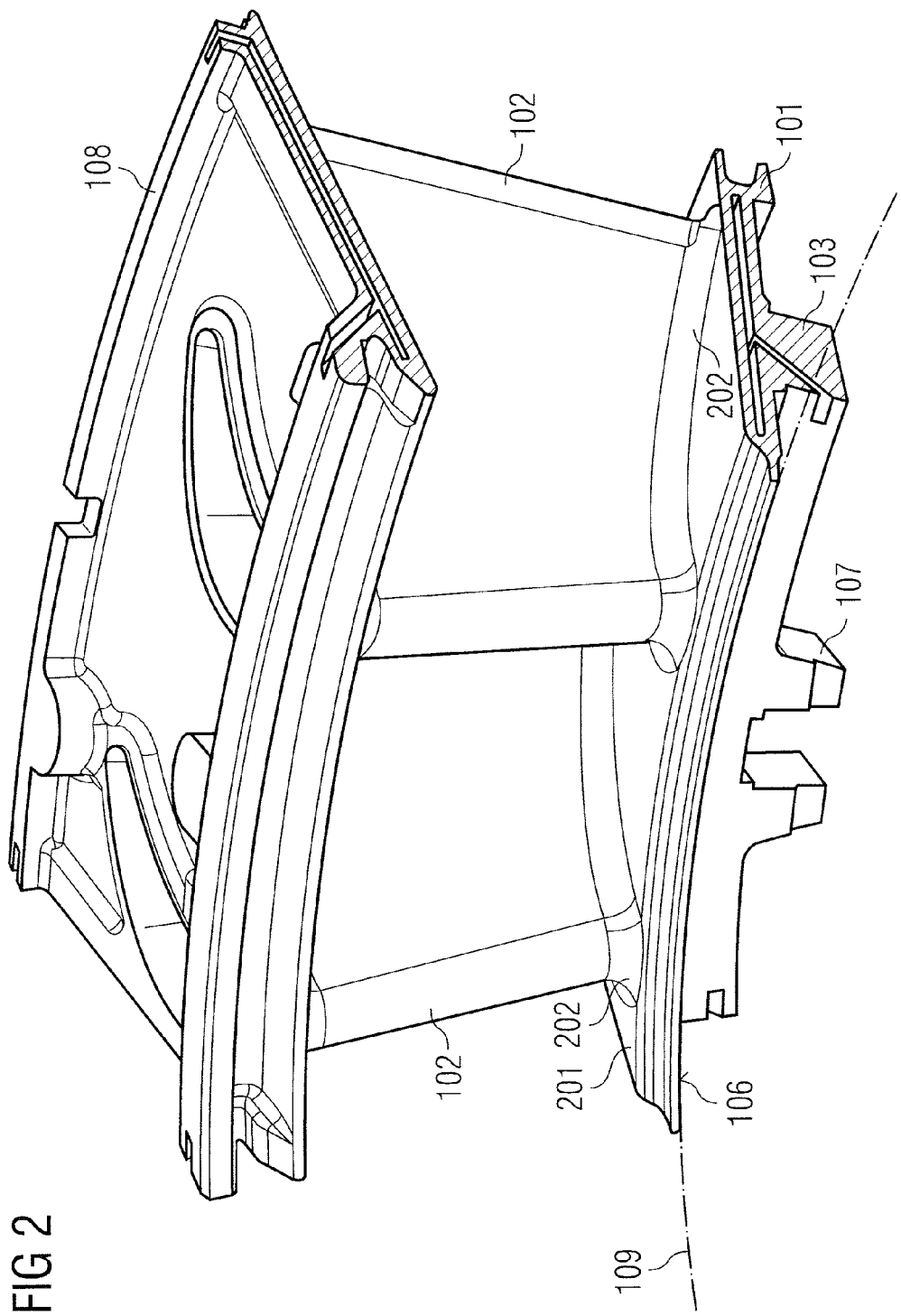
FIG. 2 illustrates a further perspective view of the guide vane device according to an exemplary embodiment of the invention.

FIG. 2 illustrates the exemplary embodiment shown in FIG. 1. The vanes 102 are formed between the first platform 101 and the second platform 108. The aerofoils 102 comprise hollow profiles through which the cooling fluid flows. The cooling fluid may be fed for instance from the outer environment of the outer platform 108 into the hollow aerofoils 102. As can be taken from FIG. 2, the aerofoils 102 comprise wing-like aerodynamic profiles. In the area of the fixing sections of the first platform 101 and the second platform 108, the aerofoils 102 comprise fillets 202 that are formed during the casting process. The inner platform 101 and the outer platform 108 proceed along the circumferential direction 109, wherein the circumferential direction 109 is defined by a direction around the rotating shaft 304 of the turbine. To the mounting section 107 of the rail 103 the sealing element, i.e. the diaphragm 303, is attached in order to provide a sealing between the guiding vane device 100 and the rotating shaft 304.

Figure 3:
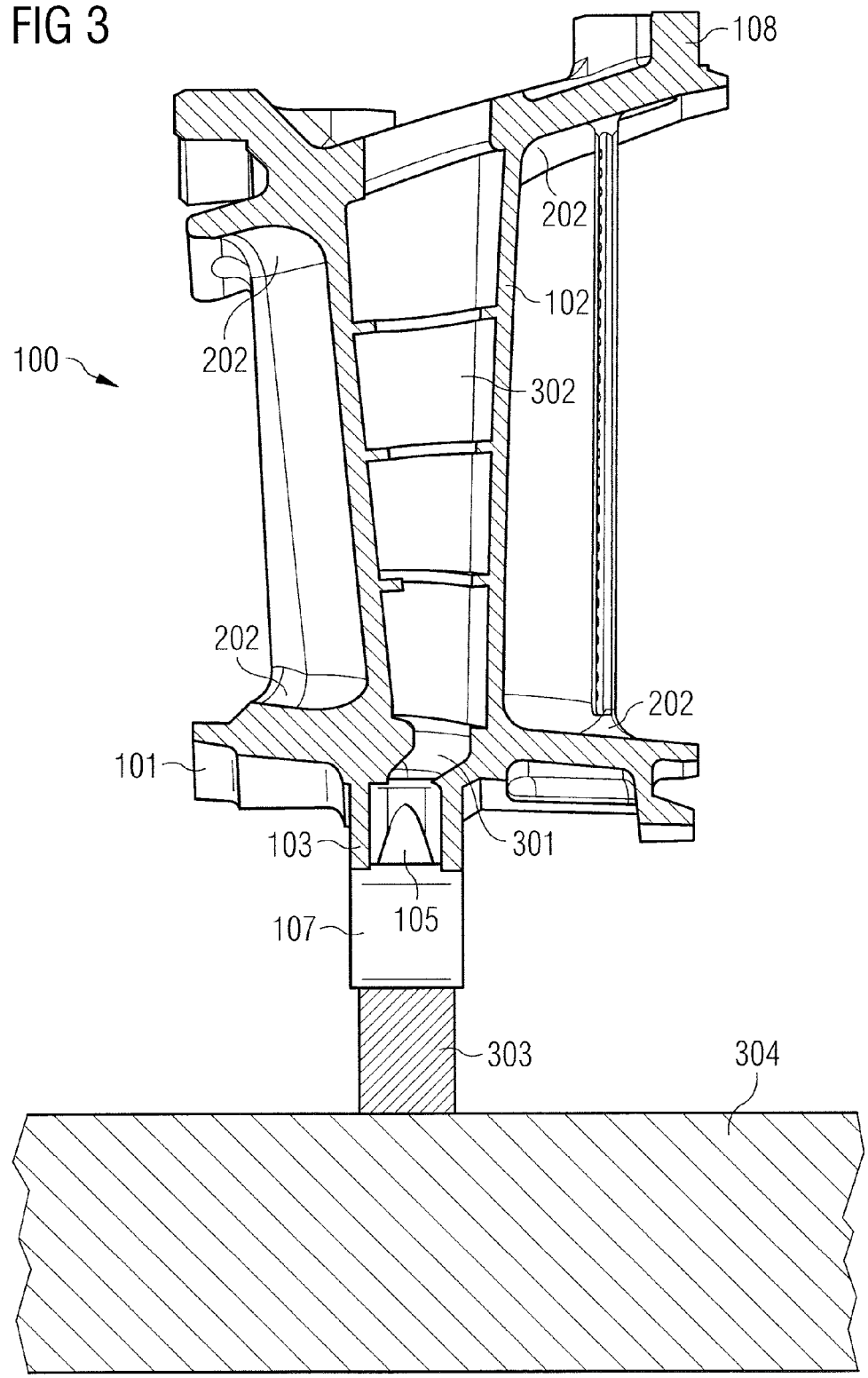
FIG. 3 illustrates a sectional view of the guide vane device according to an exemplary embodiment of the invention.

FIG. 3 shows a sectional view of the guide vane device 100. The hollow aerofoil 102 is formed between the outer platform 108 and the inner platform 101. The inner platform 101 comprises the through hole 301 that connects the hollow profile 302 of the hollow aerofoil 102 with the cooling fluid passage 105 of the rail 103. As can be taken from the FIG. 3, the cooling fluid passage 105 comprises a larger cross-sectional area, i.e. is broader and/or longer along the center axis of the rotating shaft 304, than the through hole 301. The cooling effectively of the cooling fluid is limited by the smallest passage of the cooling fluid, namely the through hole 301. For this reason, the temperature changes of the inner platform 101 as well as of the rail 103 is kept roughly equal, so that temperature stress due to temperature differences and resulting thermal deformations are reduced. Moreover, the reduction of the temperature stress of the rail 103 and the inner platform 101 may also reduce the stress in particular at the location of the fillets 202, so that cracking in these regions may be reduced.

Moreover, FIG. 3 shows the diaphragm 303 that is fixed to the mounting section 107 of the rail 103. The diaphragm 303 is in slidable contact with the surface of the rotating shaft 304. Due to the proper cooling of the rail 103 caused by the proper dimension of the cooling fluid passage 105, the thermal deformation of the rail 103 is reduced and thus the sealing characteristics of the diaphragm 303 with respect to the surface of the shaft 304 are improved.

Figure 4:
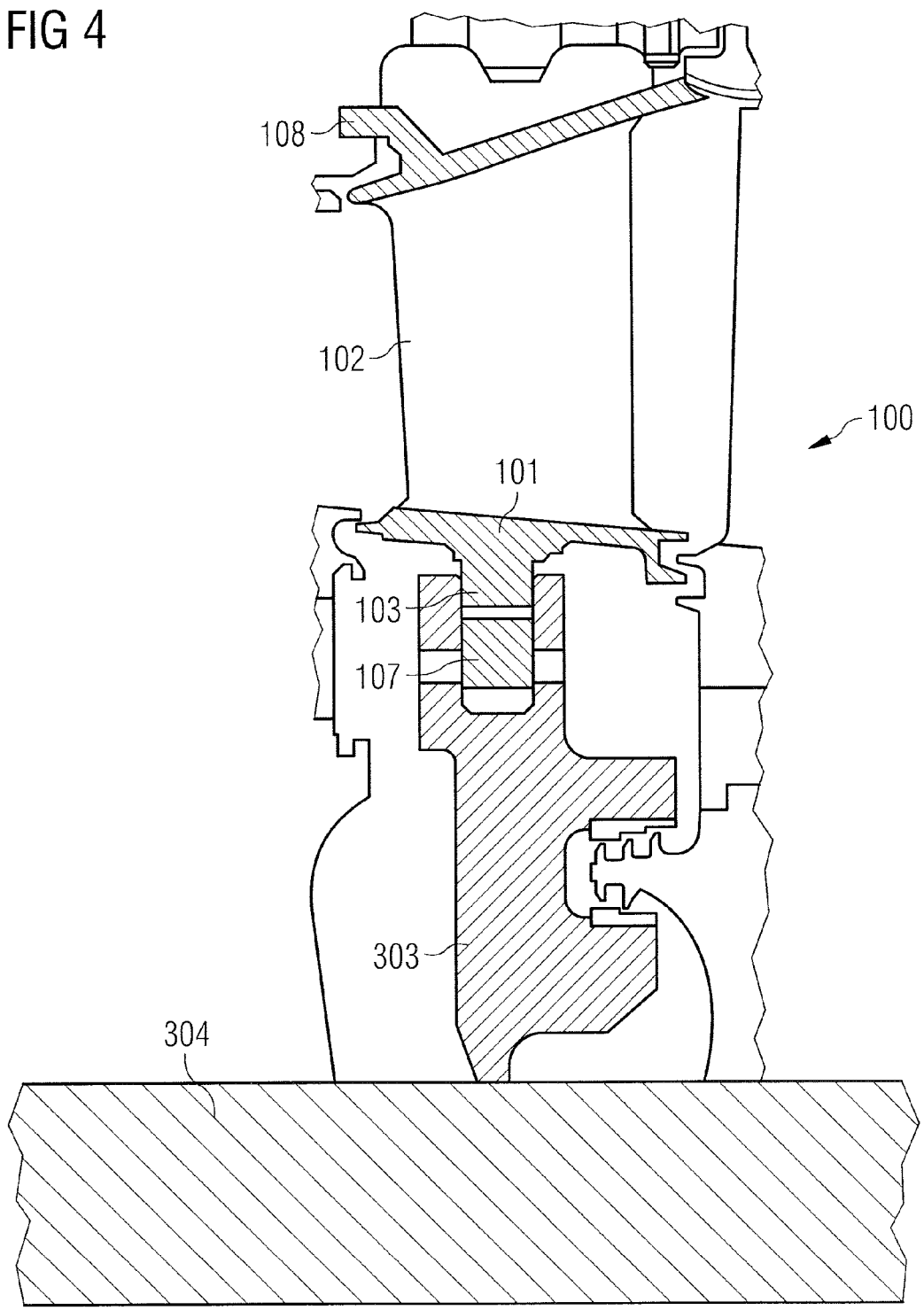
FIG. 4 illustrates a schematic drawing of a side view of the guide vane device according to an exemplary embodiment of the invention.

FIG. 4 illustrates a schematical view of the guide vane device 100 as shown in FIG. 3, wherein the diaphragm 303 is shown in more detail. The diaphragm 303 comprises a bracket-like shape and is clamped to the mounting section 107 of the rail 103. In the contact area of the diaphragm 303 with the shaft 304 the diaphragm 303 comprises a sealing lip for sealing purposes. Moreover, FIG. 4 illustrates the aerofoil 102 that is formed between the outer platform 108 and the inner platform 101.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 guide vane device
101 inner platform
102 hollow aerofoil
103 rail
104 recess
105 cooling fluid passage
106 second surface
107 mounting section
108 outer platform
109 circumferential direction
201 first surface
202 fillet
301 through hole
302 hollow profile of hollow aerofoil
303 diaphragm
304 shaft

The invention claimed is:

1. Guide vane device for a turbine, the guide vane device comprising:
   an inner platform having a body defining a through hole through which a cooling fluid flows, wherein the inner platform extends in a circumferential direction around a shaft of a turbine,
   an aerofoil having sidewalls defining a cavity in fluid communication with the through hole, wherein the aerofoil is fixed to a first surface of the inner platform,
   a rail comprising a recessed portion extending in the circumferential direction and having a cooling fluid passage formed in the recessed portion and extending from the recessed portion through a body of the rail, the cooling fluid passage overlapping a cross-section of the through hole such that the cooling fluid flows through the cooling fluid passage, the through hole, and into the cavity, wherein the rail is fixed to a second surface of the inner platform and the rail extends along the second surface in the circumferential direction around the shaft, and
   wherein the cooling fluid passage comprises in the circumferential direction at least the dimension of the through hole;
   a further aerofoil fixed to the surface of the inner platform and in flow communication with the through hole,
   wherein the inner platform comprises a further through hole for flow of the cooling fluid there through,
   wherein the rail comprises a further recessed portion comprising a further cooling fluid passage formed therein for the cooling fluid to flow through the further cooling fluid passage and to the further through hole, and
   wherein the further cooling flow passage comprises in circumferential direction at least the dimension of the further through hole.

2. The guide vane device of claim 1, wherein the cooling fluid passage has a larger cross-sectional area than the through hole.

3. The guide vane device of claim 1, wherein the rail is integrally formed with the platform.

4. The guide vane device of claim 1, wherein the aerofoil is integrally formed with the inner platform.

5. The guide vane device of claim 1, further comprising:
   an outer platform to which the aerofoil is attached at an outer end of the aerofoil.

* * * * *